United States Patent
Derocher et al.

(10) Patent No.: US 6,407,915 B1
(45) Date of Patent: Jun. 18, 2002

(54) MODULE TRAY FOR A COMPUTER DOCKING SYSTEM

(75) Inventors: Michael D Derocher, Corvallis, OR (US); Jacques H Helot, Rotterdam (NL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/547,116

(22) Filed: Apr. 11, 2000

(51) Int. Cl.[7] .............................. G06F 1/16; H05K 7/16
(52) U.S. Cl. ...................... 361/686; 361/683; 439/638; 710/303; 713/322
(58) Field of Search ................. 361/679–686, 361/724–727; 312/223.1, 223.2; 710/69, 303, 304; 713/322; 439/638, 639

(56) References Cited

U.S. PATENT DOCUMENTS

| | | | | |
|---|---|---|---|---|
| 5,186,646 A | * | 2/1993 | Pederson | 439/374 |
| 5,347,425 A | * | 9/1994 | Herron et al. | 361/683 |
| 5,436,792 A | * | 7/1995 | Leman et al. | 361/686 |
| 5,535,093 A | * | 7/1996 | Noguchi et al. | 361/686 |
| 5,555,491 A | * | 9/1996 | Tao | 361/686 |
| 5,619,397 A | * | 4/1997 | Honda et al. | 361/686 |
| 5,699,226 A | | 12/1997 | Cavello | 361/686 |
| 6,236,571 B1 | * | 5/2000 | Dohi et al. | 361/727 |
| 6,185,096 B1 | * | 2/2001 | Helot et al. | 361/686 |
| 6,208,508 B1 | * | 3/2001 | Ruch et al. | 361/686 |
| 6,222,728 B1 | * | 4/2001 | Jaggers et al. | 361/686 |
| 6,256,193 B1 | * | 7/2001 | Janik et al. | 361/683 |

OTHER PUBLICATIONS

HP Docket No. 10980827, "Mechanism For Insertion And Removal Of Adapter Trays Of A Docking Station", Filed Oct. 26, 1998, USPTO Ser. No. 09/179,241, by: Jacques H. Helot et al., pp 1–24.

* cited by examiner

*Primary Examiner*—Darren Schuberg
*Assistant Examiner*—Lisa Lea-Edmonds

(57) ABSTRACT

A system and a method for expanding the functionality of a computer docking system while also facilitating the use of the docking system with a variety of portable computer models. The present invention adds functionality to the docking system without any duplication of functionality already present, thus providing an efficient and inexpensive alternative to peripherals such as external drives and docking stations. The computer docking system includes a docking platform, a computer and a module tray. The module tray contains a non-redundant functionality module that adds a functional device to the docking system that is missing from the docking platform and computer. In addition, the module tray does not contain a duplication of the plurality of connections contained the docking platform and computer. The present invention also embodied in a method for adding non-redundant functionality to a docking system while providing adaptation of the computer to the system.

13 Claims, 4 Drawing Sheets

US 6,407,915 B1

MODULE TRAY FOR A COMPUTER DOCKING SYSTEM

FIELD OF INVENTION

The present invention relates in general to computers and more particularly to a computer docking system and method that uses a module tray to: (1) add functionality to the computer docking system; and (2) permit the computer docking system to be used with a plurality of portable computer models.

BACKGROUND

Portable computers are popular and widespread devices that provide a user with computing power in a small, lightweight portable package. Portable computers include notebook computers, laptop computers and hand-held computing devices (such as personal digital assistants (PDAs)). In order to save size and weight, portable computers frequently have less functionality than a desktop computer and have smaller devices (such as keyboards and monitors). For example, a portable computer may lack certain drive modules (such as a CD-ROM drive or a floppy drive) and may have a smaller monitor and keyboard.

The smaller devices and limited functionality associated with portable computers make them less convenient than a desktop computer to use when the user is not traveling. One common device that enables the user to use a portable computer as a "desktop replacement" is a docking system. A docking system (such as a docking station or a port replicator) facilitates the use of a portable computer with desktop computer peripherals and a network connection. For example, a typical docking system may enable a portable computer to use such peripherals as full-size keyboards, larger monitors and printers. In addition, a docking system provides common ports (such as serial and parallel ports) that plug into the portable computer.

One type of docking system is a docking station. A docking station typically contains slots for expansion cards, bays for storage devices and connectors for peripheral devices within a docking platform. One function of a docking station is to provide security for a portable computer by a locking means that secures the portable computer to the docking platform. Once the portable computer is inserted into the docking station the portable computer may function essentially as a desktop computer. In addition, the docking station manages electrical connections to the desktop peripherals as well as any network connections. Thus, a docking station permits a user to have the convenience of a desktop computer and the portability of a portable computer.

One drawback, however, to a docking station is that there are no standards and a docking station for one model of portable computer is not interchangeable with another model. In addition, a docking station duplicates much of the functionality that is already present on the portable computer. Thus, a docking station is large, cumbersome, expensive and complex.

Another type of docking system is a port replicator. A port replicator typically contains common computer ports (such as serial and parallel ports). Although less expensive, smaller and simpler than a docking station, one drawback is that a port replicator docking platform does not provide additional slots for adding devices such as expansion boards and lacks the full functionality of a docking station (such as storage devices and floppy drives).

A "slice" is another type of docking system that is similar to a docking station. In general, a slice may be a desktop device (like a docking station) or a mobile device that acts like a mobile docking station and attaches to the portable computer. A slice provides extra functionality by providing a means of adding storage devices, modules or batteries to the portable computer.

One disadvantage of a slice is that it adds additional weight, size and complexity to the portable computer. In addition, some of the functionality of a portable computer is duplicated in the slice. A slice also requires complicated installation and extraction procedures to engage and disengage the portable computer. Typically, to engage or disengage a slice from a portable computer there is both a mechanical and electrical sequence that must be performed because the portable computer must communicate with the software and operating system. Moreover, a slice generally does not provide management of electrical connections or provide security like a docking station or port replicator.

Therefore, what is needed is a system and method for adding functionality to a docking system (especially a port replicator) without duplication of functionality already present in a portable computer. A further need is for the docking system to accommodate a variety of portable computer models.

SUMMARY

A system and a method for expands the functionality of a computer docking system while also facilitating the use of the docking system with a variety of portable computer models. The present invention adds functionality to the docking system without any duplication of functionality already present, thus providing an efficient and inexpensive alternative to peripherals such as external drives and docking stations. The computer docking system includes a docking platform, a computer and a module tray. The module tray contains a non-redundant functionality module that adds a functional device to the docking system that is missing from the docking platform and computer. In addition, the module tray does not contain a duplication of the plurality of connections contained the docking platform and computer. The present invention also embodied in a method for adding non-redundant functionality to a docking system while providing adaptation of the computer to the system.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the present invention.

Referring now to the drawings in which like reference numbers represent corresponding parts throughout.

DETAILED DESCRIPTION OF THE PREFERRED EMBODIMENTS

Figure 1:
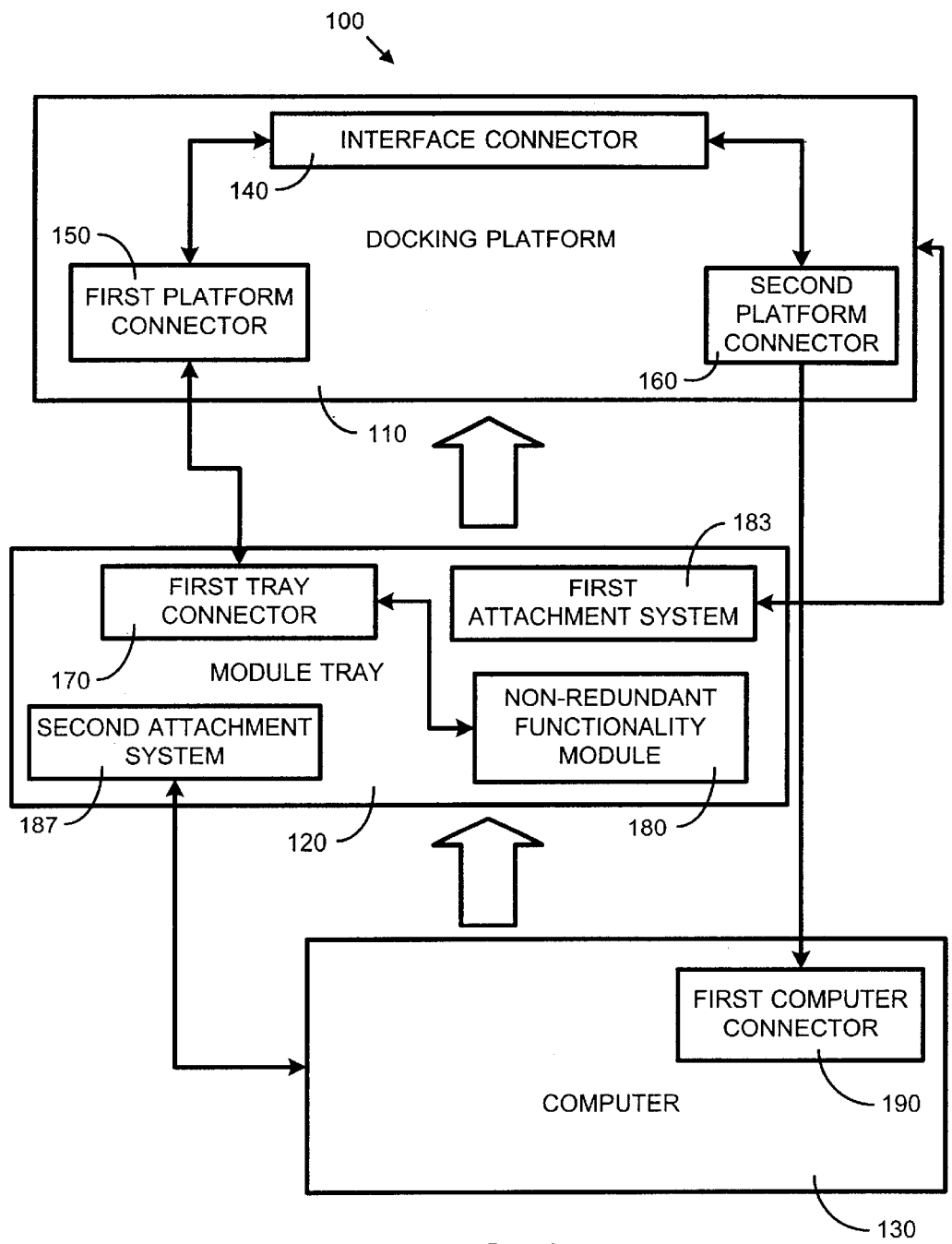
FIG. 1 is an overall block diagram of a computer docking system incorporating a first embodiment of the present invention.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

To overcome the limitations in the background as described above, and to overcome other limitations that will become apparent upon reading and understanding the present specification, the present invention is embodied in a computer docking system and a method that adds functionality to the docking system while also facilitating the use of the docking system with a variety of portable computer models. The present invention adds functionality to the docking system without any duplication of functionality already present, thus providing an efficient and inexpensive alternative to peripherals such as external drives and docking stations.

The computer docking system of the present invention includes at least two embodiments. In a first embodiment, the system includes a docking platform containing an interface connector for interfacing with peripherals, a module tray that attaches to the docking platform and a computer that attaches to the module tray. The module tray is constructed to accommodate a certain size computer, so that different sizes or models of computers may have a different associated module tray. The docking platform, however, is designed to accommodate any of these module trays. This eliminates the need to buy a separate docking platform for each model of computer.

The module tray also includes a non-redundant functionality module that adds functionality to the docking system without duplication of functionality. For example, the module tray may include a floppy disk drive that is lacking in both the docking platform and the computer. Thus, in this first embodiment, the module tray is an accessory to the docking platform that adds non-redundant functionality to the system and provides a means to adapt the docking platform to the computer.

In a second embodiment, the docking system includes a docking platform, a module tray and a computer. The computer connects directly to the module tray and the module tray connects to the docking platform. In this embodiment, the module tray is capable of being used with the computer independently of the docking platform. In other words, the module tray adds non-redundant functionality to the computer without relying on the docking platform to operate.

The present invention also is embodied in a method for adding non-redundant functionality to a docking system while providing adaptation of the computer to the system. The method providing a module tray that has non-redundant functionality and connecting the module tray to either a computer, a docking platform or both. The method also includes selecting a module tray that permits a specific computer to be used with the docking platform.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the summary or the detailed description.

The present invention uses a module tray to expand the functionality of the docking system without duplication of function. Moreover, the present invention also adapts a plurality of portable computers to a single docking platform.

A mechanism that provides the above-mentioned adaptation is discussed in commonly assigned and co-pending patent application Ser. No. 09/179,241 filed Oct. 26, 1998 entitled "MECHANISM FOR INSERTION AND REMOVAL OF ADAPTER TRAYS OF A DOCKING STATION", the entire contents of which are hereby incorporated by reference.

FIG. 1 is an overall block diagram of a computer docking system incorporating a first embodiment of the present invention. In general, the computer docking system 100 includes a docking platform 110, a module tray 120 and a computer 130. In this first embodiment the module tray 120 attaches to the docking platform 110 and the computer 130 then attaches to the docking platform 110/module tray 120 combination. Thus, the module tray 120 is generally an accessory for the docking module 110 that adds functionality and adapts the computer 130 to the docking platform 110.

The docking platform 110 includes an interface connector 140 for connecting the docking platform 110 to peripherals (such as a keyboard and a monitor) as well as managing electrical connections (including a network connection). The docking platform 110 also includes a first platform connector 150 and a second platform connector 160 for connecting the module tray 120 and the computer 130 to the docking platform 110. The module tray 120 includes a first tray connector 170, for connecting to the docking platform 110, and a functional module 180 that is connected to the first tray connector 170. The functional module 180 may include any device (such as a CD-ROM drive, a DVD player or a floppy drive) that provides additional function to the docking platform 110. The computer 130 includes a first computer connector 190 that connects to the docking platform 110.

The module tray 120 is made to adapt a specific model of computer 130 to the docking platform 110. Thus, different models of computer will generally use different module trays to adapt that particular computer to the docking platform 110. Moreover, the module tray does not duplicate a plurality of connections that are contained on the docking platform 110 and the computer 130. The module tray 120 includes a functional module 180 that adds functionality to the docking platform 110. Moreover, this additional functionality is not contained in either the docking platform 110 or the computer 130 and thus is non-redundant functionality. The module tray also includes a first attachment system 183, for attaching the module tray 120 to the docking platform 110, and a second attachment system 187, for attaching the module tray 120 to the computer 130.

The module tray 120 is attached to the docking platform 110 so that the first tray connector 170 makes a connection with the first platform connector 150. The computer 130 then attaches to the module tray 120 using the second attachment system 187 and the module tray 120 attaches to the docking platform 110 using the first attachment system 183. These attachments are made so that first computer connector 190 makes connection with the second platform connector 160. The module tray 120 is designed so that the computer 130 securely attaches to the docking platform 110/module tray 120 combination. In this configuration, the computer 130 is able to utilize the desktop peripherals connected to the docking platform 110 as well as the additional functionality provided by the module tray 120.

Figure 2:
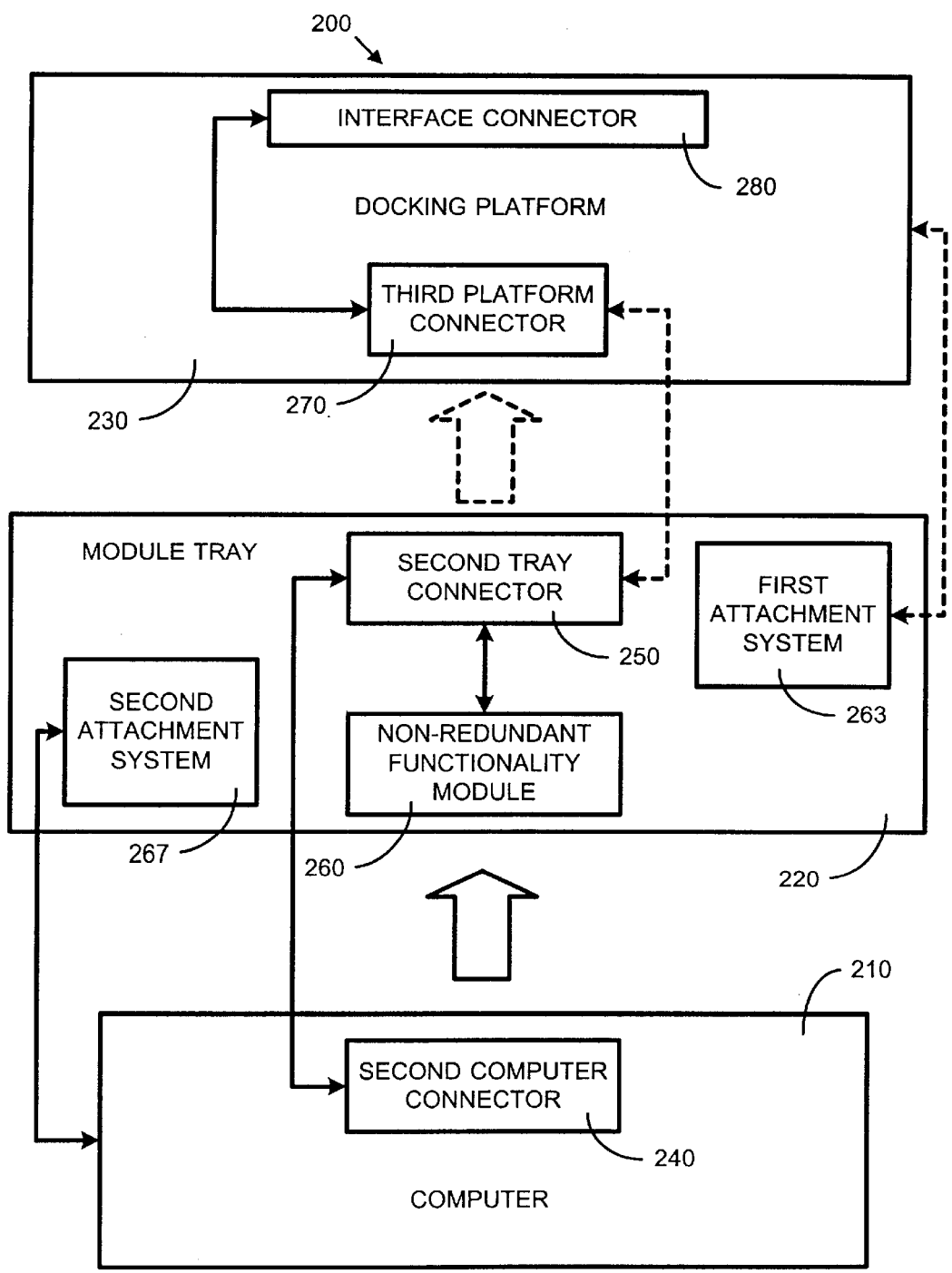
FIG. 2 is an overall block diagram of a computer docking system incorporating a second embodiment of the present invention.

FIG. 2 is an overall block diagram of a computer docking system incorporating a second embodiment of the present invention. The computer docking system 200 includes a computer 210 and a module tray 220. Optionally, the computer docking system 200 may include a docking platform 230. In this second embodiment, the computer 210 attaches to the module tray 220 and thus adds functionality to the computer 210. Alternatively, the computer 210/module tray 220 combination may be attached to the docking platform 230. In either configuration, the module tray 220 does not duplicate a plurality of connections that is contained on the docking platform 230 and the computer 210.

The computer 210 includes a second computer connector 240 that connects to a second tray connector 250 of the module tray 220. A non-redundant functionality module 260 contained on the module tray 220 provides additional functionality (such as a floppy drive) to the computer 210. This additional functionality is not contained in either the computer 210 or the docking platform 230. The module tray 220 also includes a first attachment system 263, capable of attaching the module tray 220 to the docking platform 230, and a second attachment system 267, capable of attaching the module tray 220 to the computer 210. The optional docking platform 230 includes a third platform connector 270 that connects to an interface connector 280. The interface connector 280 provides an interface to desktop peripherals such as a keyboard and a monitor.

In a preferred embodiment, the computer 210 attaches to the module tray 220, using the second attachment system 267, such that the second computer connector 240 is connected to the second tray connector 250. Moreover, the computer 210/module tray 220 combination attach to the docking platform 230, using the first attachment system 263, such that the second tray connector 250 also connects to the third platform connector 270. The dotted line between the second tray connector 250 and the third platform connector 270, the dotted arrow between the module tray 220 and the docking platform 230, and the dotted arrow between the first attachment system 263 and the docking platform 230 illustrate that this is an optional attachment.

Alternatively, the module tray 220 can be attached to the computer 210 as described above and not attached to the docking platform 230. In this embodiment, the module tray 220 is an accessory for the computer 210 and adds functionality to the computer 210 that is missing from the computer 210.

Figure 3:
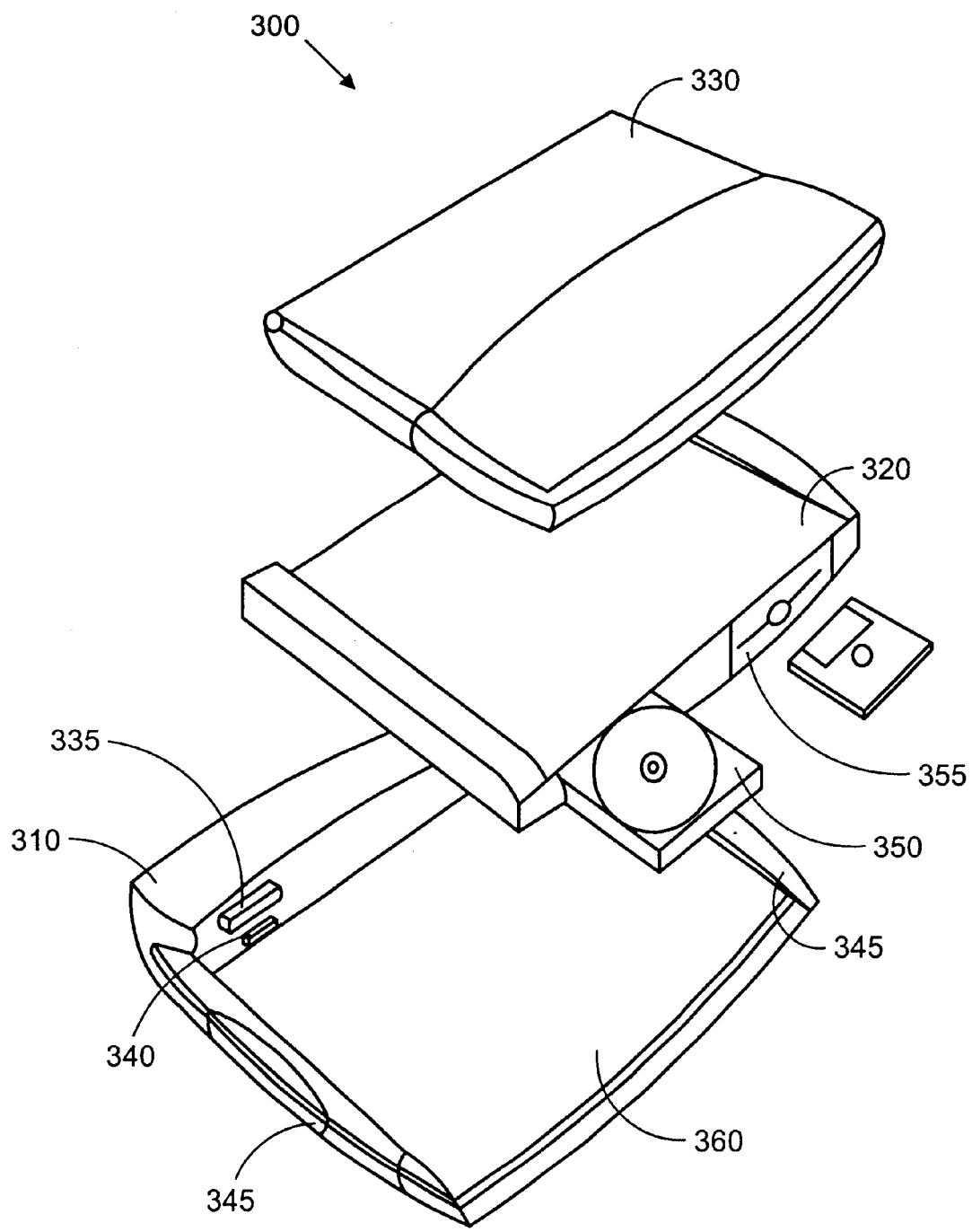
FIG. 3 is a working example, shown for illustrative purposes only, of the computer docking system of FIG. 1.

FIG. 3 is a working example, shown for illustrative purposes only, of the computer docking system of FIG. 1. The computer docking system 300 includes a port replicator 310, a drive module tray 320 and a portable computer 330. In this working example, the drive module tray 320 is an accessory to the port replicator 310 and adds non-redundant functionality (in the form of drive modules) to the port replicator 310. Thus, a user can either use the drive module tray 320 with the port replicator 310 or cannot use the drive module tray 320 and attach the portable computer 330 directly to the port replicator 310.

The port replicator 310 includes a docking connector 335, for connection with the portable computer 330, and a tray connector 340, for connection with the drive module tray 320. The port replicator 310 also includes an attachment mechanism 345 for coupling and releasing the drive module tray 320 to the port replicator 310.

The drive module tray 320 includes a CD-ROM drive 350 and a floppy disk drive 355. These two devices are not included on either the portable computer 330 or the port replicator 310, and are included on the drive module tray 320 to provide additional, non-redundant functionality to the port replicator 310. The drive module tray 320 attaches to the port replicator 310 by way of the attachment mechanism 345 on the port replicator 310. When the drive module tray 320 is securely attached to the port replicator 310, the drive module tray 320 is situated at the port replicator floor 360. Further, the attachment mechanism 345 is in secure contact with the drive module tray 320 and a drive module connector (not shown) located at the rear of the drive module tray 320 is in connection with the tray connector 340.

The portable computer 330 is attached to the drive module tray 320/port replicator 310 combination by placing the portable computer 330 in contact with a drive module tray floor 370. In this configuration, the portable computer 330 is securely attached to the drive module tray 320/port replicator 310 combination. Moreover, a computer connector (not shown) at the rear of the portable computer 330 makes a connection with the docking connector 335 when the portable computer 330 is attached to the drive module tray 320/port replicator 310 combination.

Figure 4:
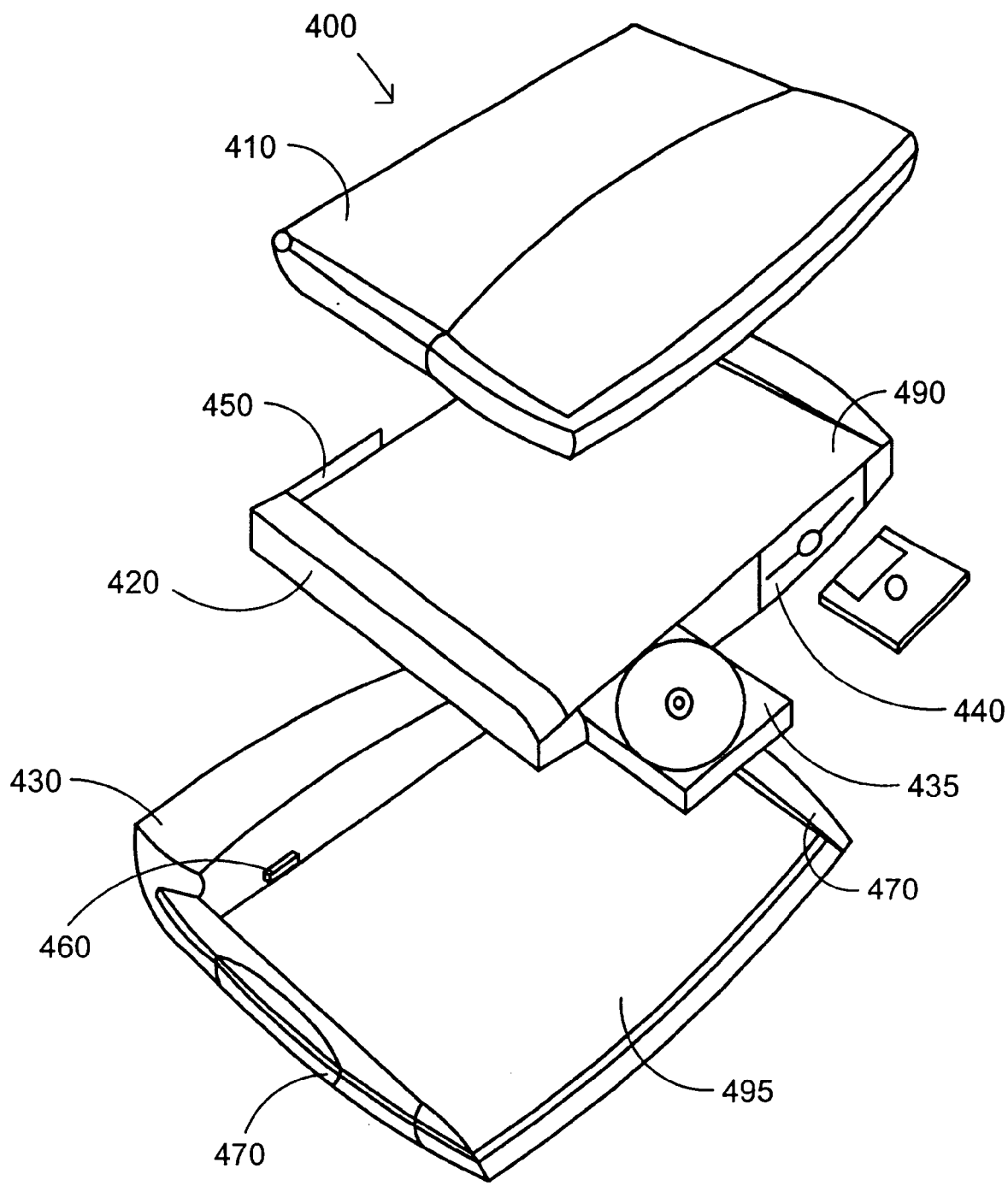
FIG. 4 is a working example, shown for illustrative purposes only, of the computer docking system of FIG. 2.

FIG. 4 is a working example, shown for illustrative purposes only, of the computer docking system of FIG. 2. The computer docking system 400 includes a portable computer 410, a drive module tray 420 and a port replicator 430. In this working example, the portable computer 410 can connect directly to the drive module tray 420 such that the drive module tray 420 may be used without the port replicator 430 to add functionality to the portable computer 410.

The drive module tray 420 includes preferably but optionally drive modules such as a CD-ROM drive module 435 or a floppy disk drive module 440. Neither of these drive modules are included on the portable computer 410 or the port replicator 430. The drive module tray 420 also includes a computer connector 450 for connecting to the portable computer 410. The port replicator 430 includes a tray connector 460, for connecting to the drive module tray 420, and an attachment mechanism 470, for securely holding the drive module tray 420 in place.

The portable computer 410 is attached to the drive module tray 420 by placing the portable computer 410 in contact with a drive module tray floor 490. Moreover, a connector (not shown) at the rear of the portable computer 410 connects to the computer connector 450 such that the drive module tray 420 can operate independently of the port replicator 430. In an optional embodiment of this working example, the portable computer 410/drive module tray 420 combination may be attached to the port replicator 430 by placing the combination in contact with the port replicator floor 495. The combination is then secured to the port replicator 430 by means of the attachment mechanism 470. When the combination is attached to the port replicator 430, a connector (not shown) on the rear of the drive tray module 420 connects to the tray connector 460.

The foregoing description of the preferred embodiments of the invention has been presented for the purposes of illustration and description. It is not intended to be exhaustive or to limit the invention to the precise form disclosed. Accordingly, the foregoing description should be regarded as illustrative rather than restrictive, and it should be appreciated that variations may be made in the embodiments described by workers skilled in the art without departing from the scope of the present invention as defined by the following claims.

What is claimed is:

1. A module tray removeably coupled to a computer and a docking platform, comprising:
   a non-redundant functionality module that provides an additional functional element missing from the computer and the docking platform without any replication of connections;
   a connector that provides coupling to the docking platform;

a first attachment system, that attaches the module tray to the docking platform; and a second attachment system, that attaches the module tray to the computer.

2. The module tray of claim 1, wherein the second attachment system adapts the computer, selected from a set of computers, to the docking platform.

3. The module tray of claim 1, wherein the connector is a tray connector that connects to both the docking platform and the computer.

4. The module tray of claim 1, wherein the additional functional element is a drive module.

5. A docking system that interfaces to a computer selected from a set of computers, comprising:

a port replicator having a plurality of connections; and a module tray, selected from a set of module trays, that adapts the selected computer to the docking platform without duplication on the module tray of the plurality of connections contained on the port replicator and the selected computer, the module tray including a non-redundant functionality module that provides a device absent from the docking station and the selected computer.

6. The docking system of claim 5, wherein the device is a drive module.

7. The docking system of claim 5, wherein the module tray further comprises:

a first attachment system that attaches the module tray to the port replicator; and a second attachment system that attaches the module tray to the computer.

8. The docking system of claim 7, wherein the module tray attaches to the port replicator and the computer such that the module tray is sandwiched between the port replicator and the computer.

9. A docking system that interfaces to a computer selected from a set of computers, comprising:

a docking platform;

a module tray, selected from a set of module trays, that adapts the selected computer to the docking platform without duplication of connections contained on the docking platform and the selected computer;

a first attachment system, that attaches the module tray to the docking platform; and a second attachment system, that attaches the module tray to the computer.

10. A method that expands the functionality of a computer device having a plurality of connections and functional devices, comprising:

providing a module tray having a non-redundant functionality module that adds a first functional device that is not contained in the plurality of functional devices;

attaching the module tray to the computer device using an attachment system;

connecting the first functional device to the computer device to expand the functionality of the computer device; and attaching the module tray to a docking platform so that the module tray is connected to both the docking platform and the computer.

11. The method of claim 10, wherein the computer device is at least one of: (a) a docking platform; (b) a computer.

12. The method of claim 10, wherein the module tray does not duplicate the plurality of connections contained on the computer device.

13. A method that expands the functionality of a computer device having a plurality of connections and functional devices, comprising:

providing a module tray with an additional functional element missing from the computer without any replication of connections;

coupling the computer to a docking platform;

attaching the module tray to the docking platform; and attaching the module tray to the computer.

* * * * *